United States Patent
Alamäki et al.

(10) Patent No.: US 9,528,526 B2
(45) Date of Patent: Dec. 27, 2016

(54) SOLUTION FOR CONTROLLING A TURBO COMPRESSOR

(75) Inventors: Jarmo Alamäki, Lappeenranta (FI); Kimmo Laine, Tampere (FI); Kenneth Eriksson, Kaarina (FI); Juha Tanttari, Kaarina (FI)

(73) Assignee: TAMTURBO Oy, Tampere (FI)

( * ) Notice: Subject to any disclaimer, the term of this patent is extended or adjusted under 35 U.S.C. 154(b) by 387 days.

(21) Appl. No.: 13/809,253

(22) PCT Filed: Jul. 4, 2011

(86) PCT No.: PCT/FI2011/050631
§ 371 (c)(1),
(2), (4) Date: Mar. 7, 2013

(87) PCT Pub. No.: WO2012/007638
PCT Pub. Date: Jan. 19, 2012

(65) Prior Publication Data
US 2013/0230412 A1    Sep. 5, 2013

(30) Foreign Application Priority Data
Jul. 13, 2010  (FI) .................................... 20105800

(51) Int. Cl.
*F04D 25/02* (2006.01)
*F02C 6/06* (2006.01)
(Continued)

(52) U.S. Cl.
CPC .............. *F04D 25/024* (2013.01); *F02C 6/06* (2013.01); *F02C 7/143* (2013.01); *F02C 9/18* (2013.01);
(Continued)

(58) Field of Classification Search
CPC .... F04D 25/16; F04D 25/024; F04D 29/4206; F04D 29/5833; F04D 17/12; F02C 7/143; F02C 9/18; F02C 6/08
(Continued)

(56) References Cited

U.S. PATENT DOCUMENTS 2,828,066 A    3/1958  Wellauer
3,680,973 A    8/1972  Pilarczyk
(Continued)

FOREIGN PATENT DOCUMENTS

DE    3114522 A1    11/1982
FR    2040794 A5    1/1971
(Continued)

OTHER PUBLICATIONS

Japanese Office Action for Japanese Patent Application No. 2013-519120 dated Jun. 2, 2015.
(Continued)

*Primary Examiner* — Devon Kramer
*Assistant Examiner* — Kenneth J Hansen
(74) *Attorney, Agent, or Firm* — Ziegler IP Law Group, LLC

(57) ABSTRACT

An actuator includes at least one stage of turbo compressor, with an outlet for conveying gas compressed in the at least one stage of turbo compressor to at least one cooler, and a shaft for rotating the at least one stage of turbo compressor, for increasing the pressure of the gas to be supplied to the actuator. The actuator also includes a turbine and a control valve by means of which the flow of compressed gas produced by the turbo compressor to the turbine is arranged to be adjusted. A method for controlling the actuator, as well as a control system for the actuator are also described.

17 Claims, 4 Drawing Sheets

(51) Int. Cl.
| | |
|---|---|
| F02C 7/143 | (2006.01) |
| F02C 9/18 | (2006.01) |
| F04D 25/04 | (2006.01) |
| F25J 3/04 | (2006.01) |
| F04D 27/02 | (2006.01) |

(52) U.S. Cl.
CPC ............... *F04D 25/04* (2013.01); *F04D 27/02* (2013.01); *F25J 3/04018* (2013.01); *F25J 3/04115* (2013.01); *F25J 3/04133* (2013.01); *F25J 3/04139* (2013.01); *F25J 3/04781* (2013.01); *F25J 2230/40* (2013.01); *F25J 2240/10* (2013.01)

(58) Field of Classification Search
USPC .................................. 417/245, 251; 415/179
See application file for complete search history.

(56) References Cited

U.S. PATENT DOCUMENTS

| | | | | |
|---|---|---|---|---|
| 4,125,345 | A * | 11/1978 | Yoshinaga | ............... F04D 17/12 |
| | | | | 415/179 |
| 4,196,773 | A | 4/1980 | Trumpler | |
| 4,342,201 | A * | 8/1982 | Ishii | .............................. 62/238.4 |
| 4,343,201 | A * | 8/1982 | Shimano | ................ B62M 25/04 |
| | | | | 74/473.14 |
| 4,751,814 | A * | 6/1988 | Farrell | ........................ 60/39.183 |
| 5,131,235 | A | 7/1992 | Watanabe | |
| 2002/0076336 | A1 * | 6/2002 | Mruk et al. | .................... 417/350 |
| 2004/0007878 | A1 | 1/2004 | Nelson et al. | |
| 2007/0271956 | A1 * | 11/2007 | Smith | ..................... F25B 11/04 |
| | | | | 62/505 |

FOREIGN PATENT DOCUMENTS

| | | | |
|---|---|---|---|
| GB | 773281 | A | 4/1957 |
| GB | 2031518 | A | 4/1980 |
| JP | S56115896 | A | 9/1981 |
| JP | 59029796 | A | 2/1984 |
| JP | H07-91760 | A | 4/1995 |
| JP | H09-119394 | A | 5/1997 |
| JP | 3054327 | B2 | 6/2000 |
| JP | 2003527515 | A | 9/2003 |
| JP | 2006-77797 | A | 3/2006 |
| JP | 2008-57440 | A | 3/2008 |
| JP | 2008082425 | A | 3/2008 |
| JP | 2008286039 | A | 11/2008 |
| WO | 99/49222 | | 9/1999 |
| WO | WO 9949222 | A1 * | 9/1999 ............. F04D 25/16 |

OTHER PUBLICATIONS

Notice of Allowance, Japan Patent Office, Application No. 119151, mailed Mar. 28, 2015, 3 pages.
Communication of a notice of opposition, European Patent Office, Application No. 11774066.2-1603/2593648, mnailed May 23, 2016, 28 pages.
Notice of opposition to a European Patent, European Patent Office, Application No. EP11774066.2, mailed May 6, 2016, 75 pages.

* cited by examiner

SOLUTION FOR CONTROLLING A TURBO COMPRESSOR

BACKGROUND

1. Field of the Invention

The aspects of the disclosed embodiments relate to a system and a method for controlling an actuator, particularly a turbo compressor, and more specifically to an actuator comprising at least one turbo compressor, with an outlet in said at least one turbo compressor for conveying compressed gas to at least one cooler, and a shaft for rotating said at least one turbo compressor, for increasing the pressure of the gas to be supplied to the actuator. The actuator relates to a turbo-type compressor in which the blades of the turbo wheels rotate at a high speed and thereby increase the pressure of the gas. The pressure increase may take place at one or more stages.

2. Brief Description of Related Developments

Primarily, two types of compressors are known: positive displacement compressors and dynamic compressors. The positive displacement compressors include, for example, screw compressors, piston compressors, and vane compressors. The positive displacement compressors are also called static compressors. The dynamic compressors, in turn, can be divided into the centrifugal and axial flow types (radial compressors and axial compressors, respectively). In dynamic compressors, air is provided with high kinetic energy which is then converted to pressure. Dynamic compressors can also be called turbo compressors.

In known solutions for controlling turbo compressors, the quantity of air and the pressure increase produced by the turbo compressor are adjusted, among other things, by guide vanes installed at the air intake of the turbo compressor, by diffuser vanes installed downstream of the impeller wheel, by changing the rotating speed of the actuator, by recirculating some of the air from the pressure side back to the suction side, or by blowing some of the compressed air out of the process via a valve.

Known methods for adjusting turbo compressors relating to combustion engines and their turbo drives are presented in technical literature in the field, publications of turbo compressor manufacturers, as well as patent publications, for example Japanese patent application publication JP 2008286039 A as well as international patent application publication WO 1999049222 A1.

Some drawbacks of the known solutions for controlling turbo compressors include, for example, the fact that they have a narrower range of capacity control compared with, for example, the range of capacity control of screw compressors, as well as the fact that when applying them, the total efficiency of the process and the actuator is lower, because of e.g. fluctuation in the need of gas, compared with e.g. the efficiency of screw compressors.

The control solution disclosed in patent publication JP 2008286039 A is designed particularly for preventing stall of turbo compressors in combustion engines, not for producing oilless compressed air with turbo compressors.

In the invention disclosed in publication WO 1999/44222 A1, the solution for generating pressure by a turbine is implemented by integrating a turbine unit in one compressor unit, which corresponds to a turbocharger structure known as such. The other compressor units are provided with separate motor units of their own. These motor units may be either with or without a step-up gear. In the solution according to said publication, superfluous air/gas, in other words air/gas that is momentarily not needed in the process, is continuously led to the turbine to provide the shaft output needed by one compressor unit. Consequently, this solution does not make it possible to adjust the production of compressed air in a wide adjustment range without changing an operating point, such as the efficiency or the rotating speed, of the compressor units.

SUMMARY

The aspects of the disclosed embodiments eliminate the above-mentioned drawbacks of prior art solutions for controlling turbo compressors, and to present an improvement in the ways of producing the quantity of gas and the control systems therein, with respect to the prior art. In one embodiment, a device can be used to supplement the output adjustment achieved by means of the operating speed more widely, possibly even down to zero output, and simultaneously to reduce the energy consumption by recovering energy produced in the expansion of gas in the turbine wheel, back to the process.

The device according to one embodiment, operates in such a way that gas that has already been compressed is led via a valve to the turbine wheel, where the gas, when expanding, rotates the turbine by means of said turbine wheel and returns some energy needed to compress the gas The turbine wheel can be placed on the same shaft with one or more turbo wheels compressing the gas, or on a separate shaft, to rotate the generator or the turbo wheel, or a combination of these.

In a multistage turbo compressor, the gas for the turbine wheel can be supplied from any stage either upstream or downstream of the inter- and aftercoolers.

In one embodiment, the device can also be built in the same housing with the turbo compressor both in the single-stage and multistage implementations.

To put it more precisely, the actuator is primarily characterized in that the actuator further comprises a turbine and a control valve by which the flow of compressed gas generated by the turbo compressor to the turbine is arranged to be controlled.

In one embodiment, a method is primarily characterized in that the actuator further comprises a turbine and a control valve, wherein, in the method, the flow of compressed gas produced by the turbo compressor to the turbine is controlled by said control valve.

In a further embodiment, a control system according is primarily characterized in that the control system further comprises a turbine and a control valve by which the flow of compressed gas generated by the turbo compressor to the turbine is arranged to be controlled.

According to a first aspect, there is provided an actuator comprising:

at least one cooler; at least one turbo compressor stage with an outlet for conveying gas compressed in said at least one turbo compressor stage to said at least one cooler; a shaft for rotating said at least one stage of turbo compressor for increasing the pressure of the gas to be supplied to the actuator; a turbine; a control valve, by means of which the flow of compressed gas produced by the turbo compressor to the turbine is arranged to be adjusted; a motor arranged to rotate said shaft, wherein the actuator is configured to use the gas that has flowed through the turbine for cooling at least one of the following: the motor of the turbo compressor; an auxiliary device.

According to a second aspect, there is provided a method for controlling an actuator, which actuator comprises at least one cooler, at least one turbo compressor with an outlet for conveying gas compressed in said at least one turbo compressor to at least one cooler, a turbine, a control valve, and a shaft to which said at least one turbo compressor is connected, wherein the method comprises rotating the shaft to raise the pressure of the gas to be supplied to the actuator; and adjusting the flow of compressed gas produced by the turbo compressor to the turbine by means of said control valve; using a motor to rotate said shaft; and using the gas that has flowed through the turbine for cooling at least one of the following: the motor of the turbo compressor; an auxiliary device.

According to a third aspect, there is provided a control system for an actuator, which actuator comprises at least one cooler; at least one stage of turbo compressor with an outlet for conveying gas compressed in said at least one stage of turbo compressor to at least one cooler, a shaft for rotating said at least one stage of turbo compressor for raising the pressure of the gas to be supplied to the actuator, a turbine, and a control valve, by means of which the flow of compressed gas produced by the turbo compressor to the turbine is arranged to be adjusted, wherein the control system further comprises a motor configured to rotate said shaft, and that the control system is configured to use the gas that has flowed through the turbine for cooling at least one of the following: the motor of the turbo compressor; an auxiliary device.

In one embodiment, in the actuator, the adjustment is made at a constant rotating speed or by changing the rotating speed to only such an extent that the efficiency of the actuator or the delivery pressure is not substantially disturbed. When the pressure starts to rise in the process, that is, the need of gas is reduced, the valve between or after the different stages in the turbo compressor is opened, wherein part of the air flow is guided to an actuator, such as a turbine unit integrated in the turbo compressor unit, or a separate turbine unit. Thus, if the turbine unit is mounted on the same shaft as the turbo compressor, the power required by the motor is reduced. If the turbine unit is mounted on a separate generator shaft, the generator rotated by the turbine unit can be used to recover electric power into the process.

The most significant differences between the disclosed embodiment and the technical solution presented in patent publication JP 2008286039 A relate to the utilization of superfluous process air/gas in generating the shaft output required for the operation of the turbo compressors.

In the solution according to the disclosed embodiments, the quantity of gas passing through the turbo compressors remains almost constant, wherein the operation can always take place in the best possible efficiency range. In the solution presented in the patent publication JP 2008 286039 A, the superfluous air/gas circulated through the turbine is returned to the compressor unit, wherein the quantity of the air/gas flowing through the compressor (and the rotating speed of the compressor) is always changed when the process is adjusted, and consequently, the compressor rarely operates in the optimum efficiency range.

Compared with the solution presented in the publication WO 19990/44222 A1, the solution according to the disclosed embodiments has, among other things, the advantage that the conveying of superfluous air/gas, which is momentarily not needed in the process, to the turbine can be adjusted, which thus makes it possible to adjust the output of compressed air in a wide adjustment range without a need to change the operating point of the turbo compressor units.

BRIEF DESCRIPTION OF THE DRAWINGS

In the following, the aspects of the disclosed embodiments will be described in more detail with reference to the appended drawings, in which.

DETAILED DESCRIPTION OF THE DISCLOSED EMBODIMENTS

Figure 1A:
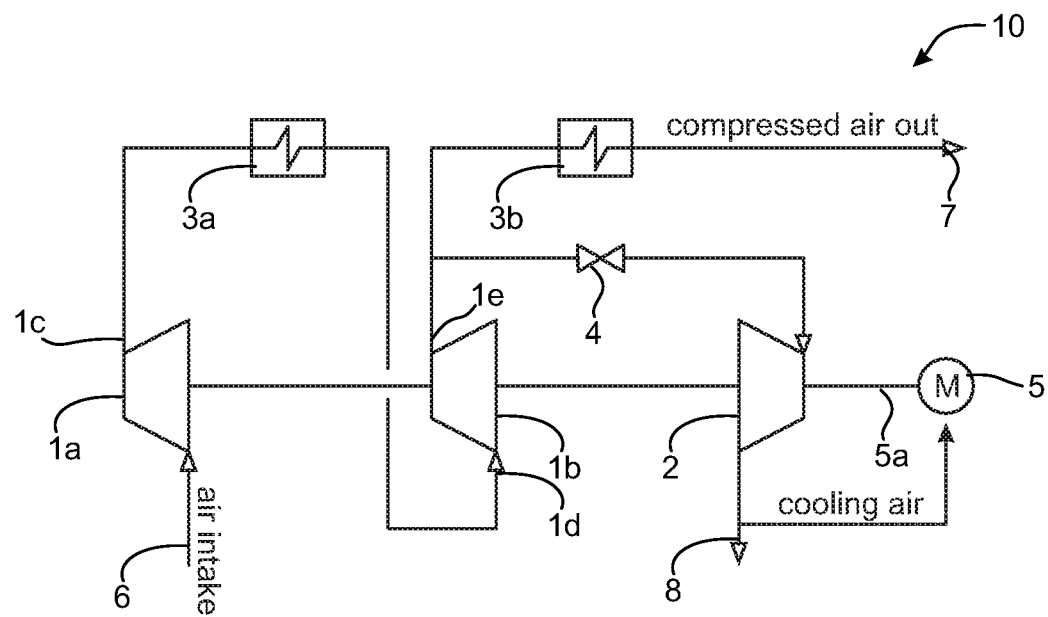
FIG. 1a shows a control system according to one embodiment in a reduced chart.

FIG. 1a shows a control system according to one embodiment for controlling an actuator 10, in a reduced chart. The actuator 10 is, for example, a turbo compressor comprising a motor 5 and turbo compressors 1a, 1b arranged in connection with a shaft 5a of the motor 5. These turbo compressors 1 may be impellers or the like, whose rotating movement produces an increase in the pressure of air or another gas; in other words, the gas is compressed to a smaller volume. The turbo compressor 10 also comprises one or more coolers 3a, 3b connected between the compressors 1 in the compressed air system. Furthermore, the turbo compressor 10 comprises a turbine 2 and a control valve 4. Moreover, the turbo compressor 10 is provided with an intake 6 for conveying air or gas into the turbo compressor 10 and, correspondingly, an outlet 7 for conveying compressed air out of the turbo compressor 10, for example to a process 11. The turbine 2 can also be provided with an outlet 8 for discharging air or gas from the turbine 2.

Figure 4:
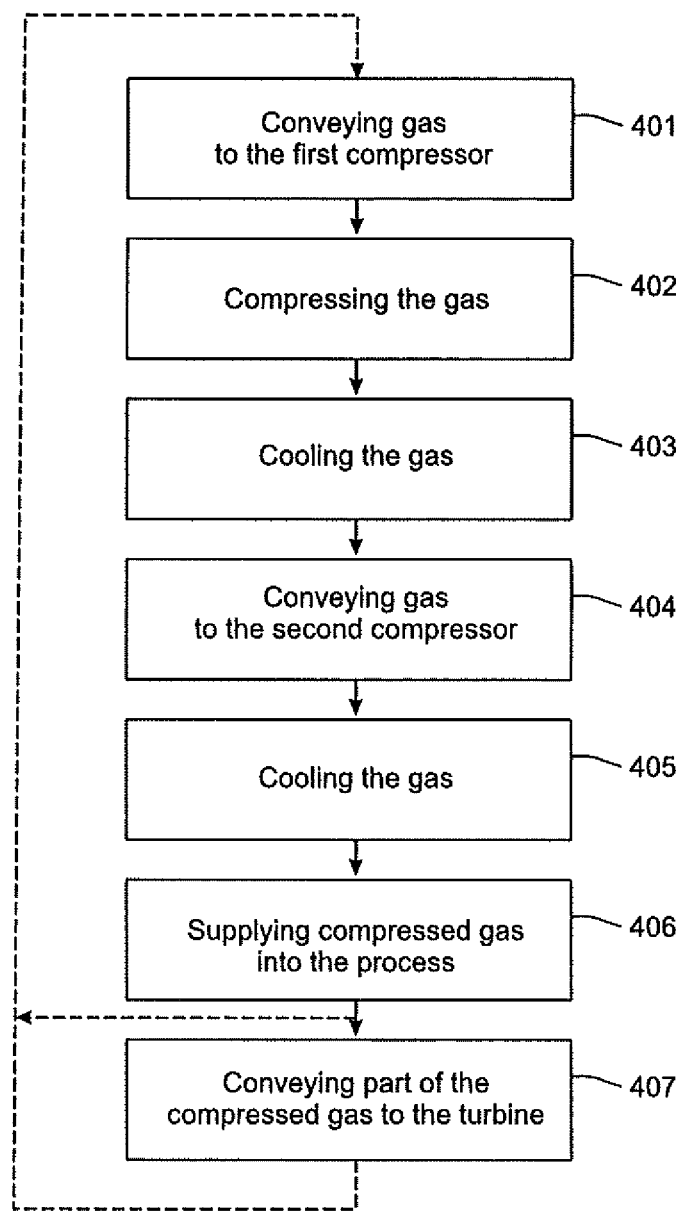
FIG. 4 shows the method according to one embodiment in a flow chart.

We shall now describe the operation of the system according to FIG. 1a with reference to the flow chart of FIG. 4. Air or other gas is supplied into the turbo compressor 10 via the intake 6, from which the air or other gas is conveyed to a first stage of turbo compressor 1a (block 401 in FIG. 4). The rotating movement of the shaft 5a of the motor 5 also generates the rotation of the turbo compressors 1a, 1b. Thus, the movement of the impeller of the turbo compressor 1a, 1b increases the pressure and the temperature of the gas (block 402). The compressed gas is led via the outlet 1c of the first stage of turbo compressor and a flow channel 12 to a first cooler 3a, in which the temperature of the gas is lowered (block 403). From the first cooler 3a, the gas is conveyed to a second stage of turbo compressor 1b, for example via an intake 1d (block 404). The impeller wheel of the second turbo compressor 1b is also in connection with the motor shaft 5a, wherein the rotating movement of the motor shaft 5a generates the rotation of the impeller wheel, which increases the gas pressure further. From the second stage of turbo compressor 1b, the compressed gas is led, for example via an outlet 1e, to a second cooler 3b for lowering the gas temperature (block 405). From the second cooler 3b, the compressed gas can be led via an outlet 7 for example to the process 11 (block 406).

In a situation in which the pressure starts to rise in the process 11, that is, the gas demand in the process 11 decreases, the control valve 4 can be used to direct part of the gas in the turbo compressor 10 to the turbine 2 (block 407). In the device shown in FIG. 1a, this gas flow to the turbine 2 has the effect that the turbine 2 reduces the need for power supply in the motor 5; in other words, the turbine 2 in a way returns part of the energy needed for compressing the gas, to the motor shaft 5a. That part of the gas which was led to the turbine can be conveyed via the outlet 8 of the turbine, for example to the atmosphere, or back to the intake 6 of the turbo compressor.

When the pressure in the process 11 begins to decline, the control valve 4 can be adjusted in the closing direction or totally closed, wherein the amount of gas to be led to the turbine 2 is reduced or the supply of gas to the turbine 2 is cut off. If there is need for adjustment again, this can be done in the above-described manner by means of the control valve 4. In this way, the power control and simultaneously the efficiency of the system can also be adjusted, in addition to adjusting the rotating speed of the motor 5, by directing part of the gas to the turbine 2.

During the adjustment, changing the rotating speed of the motor shaft 5 is either not necessary at all or is only necessary to such an extent that the efficiency or the delivery pressure of the turbo compressor 10 is not substantially reduced.

The above-mentioned steps can be repeated, if necessary.

Figure 3:
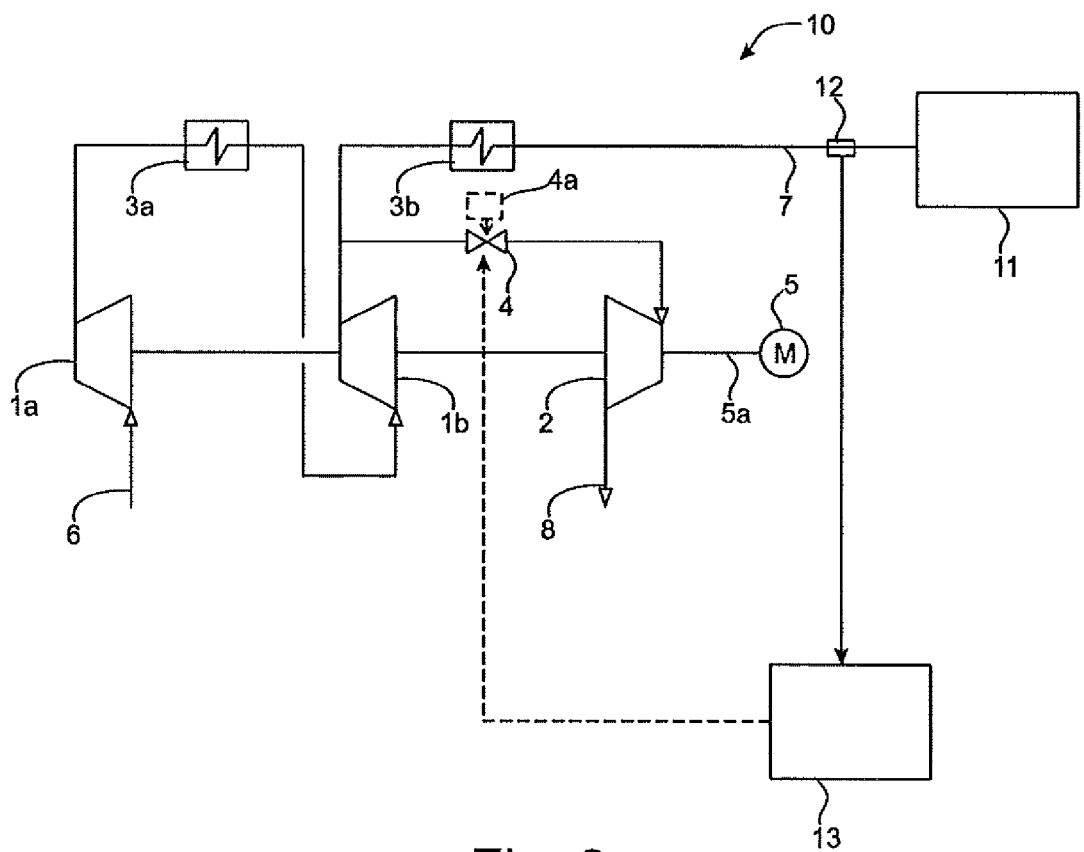
FIG. 3 shows a process system in which the disclosed embodiments can be applied.

In the embodiment shown in FIG. 1a, the turbine 2 is arranged on the same shaft with the compressors 1a, 1b. This shaft is advantageously the motor shaft 5a, but it may also be another shaft which is in a power transmitting connection with the motor shaft 5a. The arrangement of FIG. 1a can also be implemented in such a way that a generator is also coupled to the shaft connecting the turbine 2 and the turbo compressors 1a, 1b, to generate electric power particularly in a situation in which gas is utilized for rotating the turbine 2. This electric power can be supplied, for example, to the motor 5 or to the process 11 (FIG. 3).

Figure 1B:
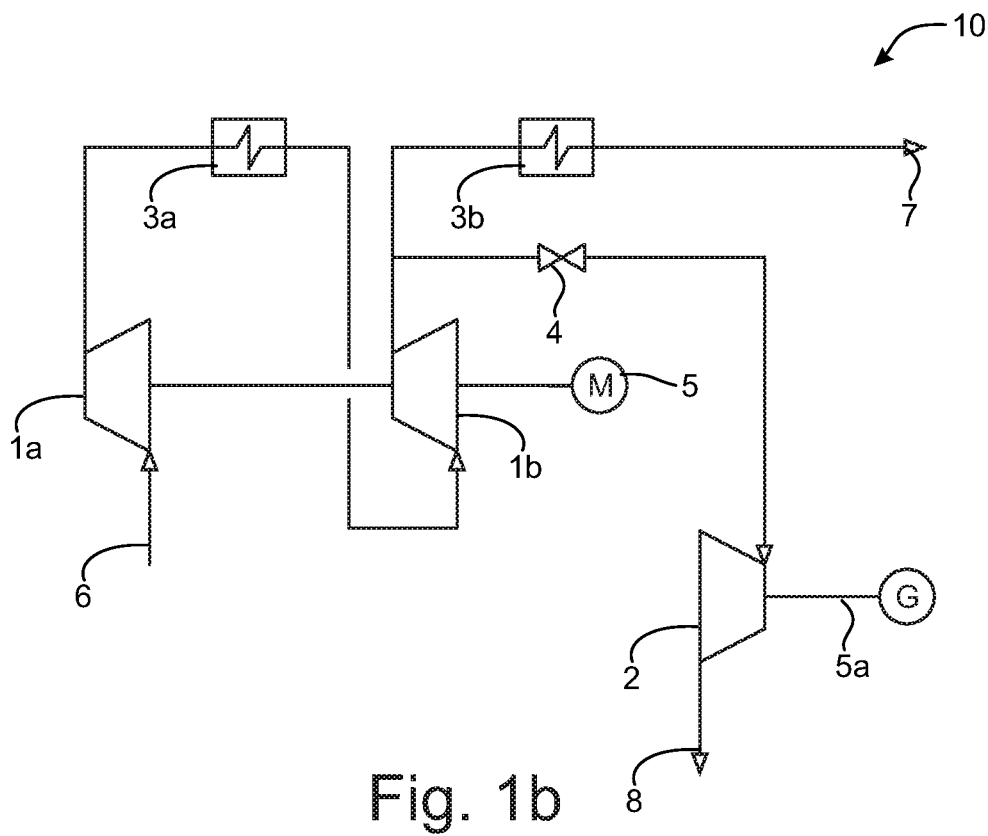
FIG. 1b shows a device according to another embodiment in a reduced chart.

FIG. 1b shows a control system according to another embodiment. The difference to the embodiment of FIG. 1a lies primarily in that the turbine 2 is not connected to the motor shaft 5a but it is implemented as a separate element. Thus, the turbine 2 is arranged to rotate the generator 9. Thus, in a situation in which part of the gas is led via the control valve 4 to the turbine 2, the rotational motion of the turbine 2 has the effect that the generator generates electric power which can be supplied to the motor 5. This reduces the amount of electric power required by the motor 5 from another energy source.

Figure 1C:
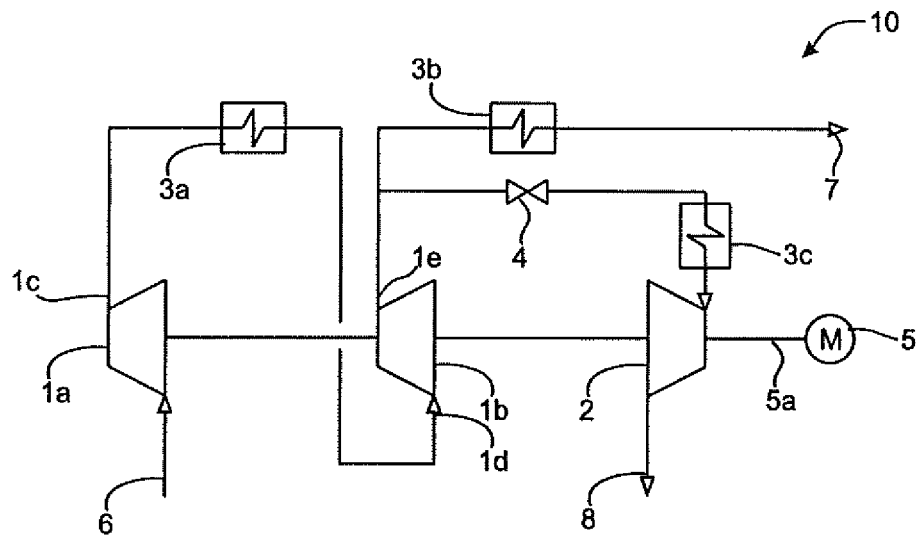
FIG. 1c shows a device according to a further embodiment in a reduced chart.

FIG. 1c shows a control system according to a third embodiment. The difference to the embodiment of FIG. 1a lies primarily in that the gas supplied to the turbine 2 is cooled in a cooler 3c. Thus, the temperature of the gas output from the turbine 2 may be lower than in a situation in which no cooler 3c is used. It is obvious that the cooler 3b can also be implemented in the embodiment shown in FIG. 1b by including the cooler between the outlet of the control valve 4 and the intake of the turbine 2.

Figure 1D:
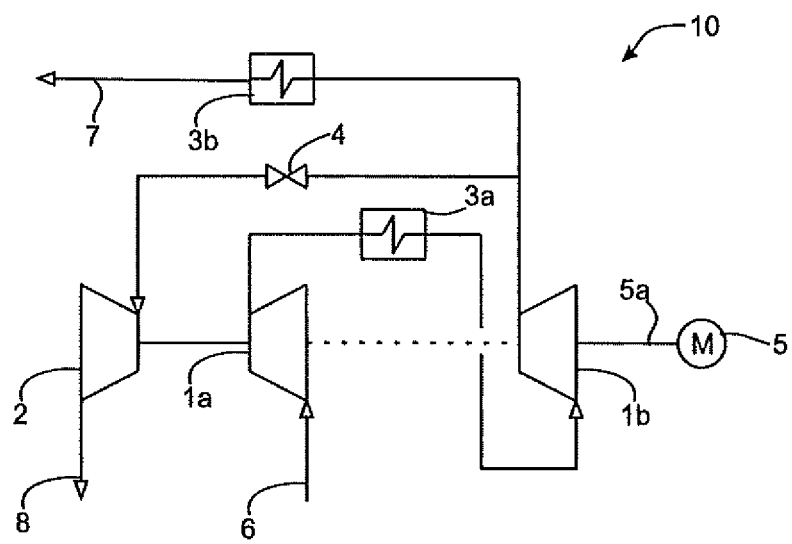
FIG. 1d shows a device according to a further embodiment in a reduced chart.

FIG. 1d shows a control system according to a fourth embodiment. The difference to the embodiment of FIG. 1b lies primarily in that the turbine 2 is connected not to the generator but to the first stage of turbo compressor 1a; in other words, the turbine 2 is arranged to rotate the first stage of turbo compressor 1a. Thus, in a situation in which part of the gas is led via the control valve 4 to the turbine 2, the rotational motion of the turbine 2 makes the impeller wheel of the first stage of turbo compressor 1a rotate, wherein the first stage of turbo compressor 1a raises the pressure of the incoming gas. In some embodiments, power can be transmitted to the first stage of turbo compressor 1a from both the motor 5 and the turbine 2. Such a combined power transmission arrangement may require a gear system or the like, by which the power transmitted from two different power sources can be transferred in a controlled manner to the first stage of turbo compressor 1a.

As can be found from the description above, the control system according to the disclosed embodiments can be used to achieve better adjustment and a wider adjustment range than in the prior art.

Although two turbo compressor stages were applied in the embodiments described above, it is obvious that there may also be more than two stages, for example three, four or more stages.

Figure 2:
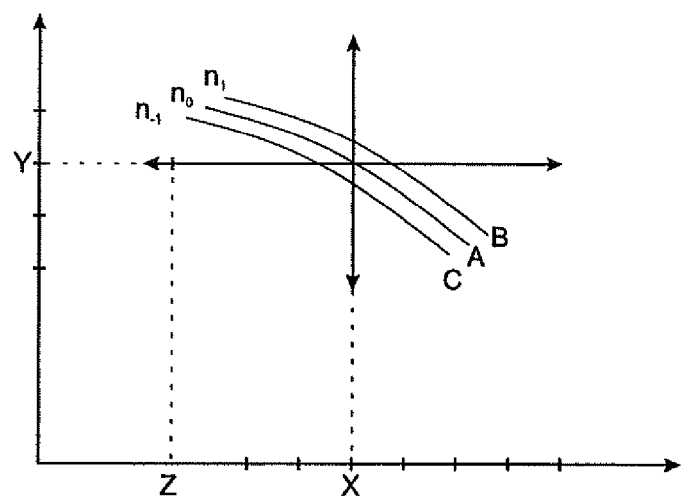
FIG. 2 shows control characteristic curves for a device according to one embodiment.

FIG. 2 shows an example of control characteristic curves. The horizontal axis and the vertical axis represent the quantity of volume flow and the pressure, respectively. The value X of the volume flow represents the projected value (100%), and the pressure value Y represents the corresponding target pressure. The curve A depicts the characteristic curve of a turbo compressor system of prior art (ratio of volume flow to pressure) at a rotational speed $n_0$ of the motor, the curve B depicts the characteristic curve of the system at a given maximum rotational speed $n_1$ higher than the rotational speed $n_0$, and the curve C depicts the characteristic curve of the system at a given minimum rotational speed $n_{-1}$ lower than the rotational speed $n_0$. The letter Z indicates a volume flow/pressure ratio that can be achieved by the system according to the one embodiment of the present disclosure, the corresponding rotational speed of the motor shaft 5a being $n_{-1}$. In a device of prior art, the adjustment of the rotational speed n can be used to reduce the volume flow by only a few percent lower than the projected value of 100%. In the solution according to the present embodiment, it is possible to achieve a value of less than a half, in an advantageous embodiment even a value of about 20% of the projected value, without having to reduce the rotational speed significantly. Thus, a good efficiency is achieved.

In some advantageous embodiments, the projected pressure value can be in the order of 6 to 10 bar, but it may also be higher than that, for example 13 bar, or lower than that, even lower than 1 bar.

The aspects of the disclosed embodiments are suitable for use in a very wide power range. The power of the turbo compressor 10 may be, for example, between 100 kW and 1 MW, but it may also be lower than 100 kW or even higher than 1 MW.

FIG. 3 shows yet another example of the process 11, in which the actuator according to the invention can be used. The process 11 may be any process in which compressed gas is needed. The process 11 or the outlet 7 of the turbo compressor 10 is provided with, for example, a pressure sensor 12 or the like, for measuring the pressure of the gas supplied into the process 11. The measurement data given by the pressure sensor 12 is transmitted to a control unit 13 which may, for example, compare the measurement data with a reference value and determine, on the basis of the comparison, for example if there is a need to adjust the control valve 4. If it is found that the pressure has exceeded the reference value, the control unit 13 transmits information that the control valve 4 has to be opened, to the control means 4a of the control valve 4. In some embodiments, the control unit 13 may directly generate a signal, for example a voltage, which effects a change in the position of the control valve 4. In such a case, the control means 4a for the control valve is not necessary.

Correspondingly, in a situation in which the pressure has declined, for example, to a given limit value, the control unit 13 may control the control valve 4 in the closing direction, which reduces or totally prevents the flow of gas to the turbine 2.

It is obvious that the control valve 4 may also have other positions than the open and closed positions, wherein, according to the situation, the quantity of gas to be led to the turbine 2 may also be somewhere between the maximum and minimum values.

Even though it was presented above that the gas is supplied to the turbine 2 downstream of the second stage of turbo compressor 1b, in a multistage turbo compressor the gas can be supplied from any stage either upstream or downstream of the inter- and aftercoolers 1a, 1b.

The device can also be built in the same housing with the turbo compressor in both the single-stage and multistage implementations.

In some embodiments, all or part of the gas that has flowed through the turbine 2 unit can be utilized for cooling the motor 5 of the turbo compressor, auxiliary devices, and/or the gas produced by the turbo compressor 10.

In some embodiments, the adjustment of the compressors 1a, 1b and the turbine 2 is implemented by utilizing high speed technology, in which the peripheral speeds of the actuators are typically even 100 m/s or higher. For example, a high speed motor can be used as the motor 5.

In some embodiments, the bearings of the compressors 1a, 1b, the turbine 2 and/or the motor 5 can be implemented with, for example, air bearings, gas bearings, or so-called hybrid bearings, that is, as a combination of an air or gas bearing and a magnet bearing.

It is obvious that the present invention is not limited solely to the above-presented embodiments but it can be modified within the scope of the appended claims.

The invention claimed is:

1. An apparatus comprising:
   at least a first cooler;
   a first turbo compressor with an air outlet for conveying air compressed in said first turbo compressor to said first cooler;
   a second turbo compressor with an air intake;
   said first cooler connected between the air outlet of the first turbo compressor and the air intake of the second turbo compressor;
   wherein the apparatus further comprises:
   a shaft for rotating said first turbo compressor for increasing the pressure of the air to be supplied to an actuator;
   a turbine mounted on the same shaft as the first turbo compressor and the second turbo compressor;
   a control valve, by means of which the flow of compressed air produced by the second turbo compressor to the turbine is arranged to be adjusted;
   a motor arranged to rotate said shaft,
   wherein the apparatus is configured to use the air that has flowed through the turbine for cooling the motor.

2. The apparatus according to claim 1, wherein said turbine is connected to said shaft.

3. The apparatus according to claim 2 further comprising a generator connected to said shaft.

4. The apparatus according to claim 1 further comprising a generator arranged in a power transmitting connection with the turbine.

5. The apparatus according to claim 1, wherein said control valve is configured to convey air from the first cooler to the turbine.

6. The apparatus according to claim 1 further comprising at least a second cooler connected between the outlet of the second turbo compressor and an outlet of an actuator.

7. The apparatus according to claim 6, wherein said control valve is arranged to convey air from the second cooler to the turbine.

8. The apparatus according to claim 1, wherein the motor is a high speed motor.

9. The apparatus according to claim 1 further comprising a third cooler connected between the turbine and the control valve.

10. The apparatus according to claim 1, wherein the control valve is adapted to control flow of cooled, compressed air from the first turbo compressor to the turbine via the first cooler.

11. The apparatus according to claim 10, wherein the outlet of said first turbo compressor is coupled to an inlet of the control valve; and an outlet of the control valve is coupled to said first cooler; and an outlet of said first cooler is coupled to an intake of the turbine.

12. The apparatus according to claim 1 further comprising a generator, wherein said turbine is adapted to rotate the generator; and electric power generated by rotation of the generator is adapted to be supplied to at least one of the following:
   the motor;
   a process.

13. A method for controlling an apparatus, which apparatus comprises at least a first cooler, at least a first turbo compressor with an outlet for conveying air compressed in said first turbo compressor to the first cooler, a second turbo compressor with an air intake, said first cooler connected between the air outlet of the first turbo compressor and the air intake of the second turbo compressor, a turbine, a control valve, and a shaft to which said first turbo compressor, the second turbo compressor and the turbine are connected, wherein the method comprises:
   rotating the shaft to raise the pressure of the air to be supplied to an actuator; and
   adjusting the flow of compressed air produced by the second turbo compressor to the turbine by means of said control valve;
   using a motor to rotate said shaft; and
   using the air that has flowed through the second turbine for cooling the motor of the turbo compressor.

14. A control system for an apparatus, which apparatus comprises:
   at least a first cooler;
   a first turbo compressor with an air outlet for conveying air compressed in said first turbo compressor to the first cooler,
   a second turbo compressor with an air intake;
   a shaft for rotating said first turbo compressor for raising the pressure of the air to be supplied to an actuator,
   a turbine mounted on the same shaft as the at least one turbo compressor and the second turbo compressor, and
   a control valve, by means of which the flow of compressed air produced by the second turbo compressor to the turbine is arranged to be adjusted,
wherein the control system further comprises a motor configured to rotate said shaft, and that the control system is configured to use the air that has flowed through the turbine for cooling the motor.

15. An apparatus comprising:
   at least a first cooler;
   a first turbo compressor with an air outlet for conveying air compressed in said first turbo compressor to said first cooler;

a second turbo compressor with an air intake;
said first cooler connected between the air outlet of the first turbo compressor and the air intake of the second turbo compressor;
wherein the apparatus further comprises:
a shaft for rotating said first turbo compressor for increasing the pressure of the air to be supplied to an actuator;
a turbine mounted on the same shaft as the first turbo compressor and the second turbo compressor;
a control valve, by means of which the flow of compressed air produced by the second turbo compressor to the turbine is arranged to be adjusted;
a high speed motor arranged to rotate said shaft,
wherein the apparatus is configured to use the air that has flowed through the turbine for cooling an auxiliary device.

16. The apparatus according to claim 15, wherein a peripheral speed of the high speed motor is 100 m/s or higher.

17. An apparatus comprising:
a first cooler;
a second cooler;
a first turbo compressor with an air outlet for conveying air compressed in said first turbo compressor to said first cooler;
a second turbo compressor with an air intake;
said first cooler connected between the air outlet of the first turbo compressor and the air intake of the second turbo compressor;
wherein the apparatus further comprises:
a shaft for rotating said first turbo compressor for increasing the pressure of the air to be supplied to an actuator;
a turbine mounted on the same shaft as the first turbo compressor and the second turbo compressor;
a control valve, by means of which the flow of compressed air produced by the second turbo compressor to the turbine is arranged to be adjusted;
a high speed motor arranged to rotate said shaft,
wherein the apparatus is configured to use the air that has flowed through the turbine for cooling an auxiliary device, and further wherein said control valve is configured to convey air from at least one of the first cooler and the second cooler to the turbine.

\* \* \* \* \*